US012749227B2

(12) United States Patent
Lim et al.

(10) Patent No.: US 12,749,227 B2
(45) Date of Patent: *Sep. 29, 2026

(54) APPARATUS AND METHOD FOR CODING/DECODING IMAGE SELECTIVELY USING DISCRETE COSINE/SINE TRANSFORM

(71) Applicant: Dolby Laboratories Licensing Corporation, San Francisco, CA (US)

(72) Inventors: Sung Chang Lim, Daejeon (KR); Se Yoon Jeong, Daejeon (KR); Hae Chul Choi, Daejeon (KR); Jin Soo Choi, Daejeon (KR); Jin Woo Hong, Daejeon (KR); Yung Lyul Lee, Seoul (KR); Dae Yeon Kim, Seoul (KR)

(73) Assignee: Dolby Laboratories Licensing Corporation, San Franciso, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/190,251

(22) Filed: Apr. 25, 2025

(65) Prior Publication Data

US 2025/0252609 A1 Aug. 7, 2025

Related U.S. Application Data

(63) Continuation of application No. 19/059,053, filed on Feb. 20, 2025, which is a continuation of application (Continued)

(30) Foreign Application Priority Data

Oct. 2, 2008 (KR) ........................ 10-2008-0097144
Sep. 30, 2009 (KR) ........................ 10-2009-0093127

(51) Int. Cl.
*H04N 19/12* (2014.01)
*G06T 9/00* (2006.01)
(Continued)

(52) U.S. Cl.
CPC .............. *G06T 9/007* (2013.01); *G06T 9/004* (2013.01); *H04N 7/17318* (2013.01);
(Continued)

(58) Field of Classification Search
CPC ..... G06T 9/007; G06T 9/004; H04N 7/17318; H04N 19/12; H04N 19/147; H04N 19/19;
(Continued)

(56) References Cited

U.S. PATENT DOCUMENTS 5,040,217 A 8/1991 Brandenburg et al.
5,394,473 A 2/1995 Davidson
(Continued)

FOREIGN PATENT DOCUMENTS

CN 1501717 A 6/2004
CN 101310536 A 11/2008
(Continued)

OTHER PUBLICATIONS

"Advanced Video Coding For Generic Audiovisual Services", H.264: ITU-T, Telecommunication Standardization Sector Of ITU, International Telecommunication Union, Nov. 2007 (564 Pages In English).

(Continued)

*Primary Examiner* — Tung T Vo
(74) *Attorney, Agent, or Firm* — Shield Intellectual Property PC; Zhichong Gu

(57) ABSTRACT

Disclosed is a data transmission system that transmits data by using a relay. The relay selects a transmission terminal from among a plurality of terminals accessing a base station. A base station transmits base station data to the relay during a first time slot, and the transmission terminal transmits terminal data to the relay. The relay transmits terminal data to the base station during a second time slot, and transmits base station data to the transmission terminal.

5 Claims, 14 Drawing Sheets

| OP | SF(i,j) | | | | | |
|---|---|---|---|---|---|---|
| | LOCATION AT (I,J), I=[3,7] AND J=[3,7] | LOCATION AT (I,J), I=[0,2,4,6] AND J=[0,2,4,6] | LOCATION AT (I,J), I=[1,5] AND J=[1,5] | LOCATION AT (I,J), (I=[3,7], J=[0,2,4,6]) ∩ (I=[0,2,4,6], J=[3,7]) | LOCATION AT (I,J), (I=[3,7], J=[1,5]) ∩ (I=[1,5], J=[3,7]) | LOCATION AT (I,J), (I=[1,5], J=[0,2,4,6]) ∩ (I=[0,2,4,6], J=[1,5]) |
| 0 | 20 | 18 | 32 | 19 | 25 | 24 |
| 1 | 22 | 19 | 35 | 21 | 28 | 26 |
| 2 | 26 | 23 | 42 | 24 | 33 | 31 |
| 3 | 28 | 25 | 45 | 26 | 35 | 33 |
| 4 | 32 | 28 | 51 | 30 | 40 | 38 |
| 5 | 36 | 32 | 58 | 34 | 46 | 43 |

Related U.S. Application Data

No. 17/990,584, filed on Nov. 18, 2022, now Pat. No. 12,260,599, which is a continuation of application No. 17/397,851, filed on Aug. 9, 2021, now Pat. No. 11,538,198, which is a continuation of application No. 14/045,511, filed on Oct. 3, 2013, now Pat. No. 11,176,711, which is a continuation of application No. 13/128,995, filed as application No. PCT/KR2009/005675 on Oct. 5, 2009, now abandoned.

(51) Int. Cl.

| | |
|---|---|
| ***H04N 7/173*** | (2011.01) |
| ***H04N 19/147*** | (2014.01) |
| ***H04N 19/19*** | (2014.01) |
| ***H04N 21/236*** | (2011.01) |
| *H04N 19/132* | (2014.01) |
| *H04N 19/149* | (2014.01) |
| *H04N 19/46* | (2014.01) |
| *H04N 19/70* | (2014.01) |

(52) U.S. Cl.
CPC ........... *H04N 19/12* (2014.11); *H04N 19/147* (2014.11); *H04N 19/19* (2014.11); *H04N 21/236* (2013.01); *H04N 19/132* (2014.11); *H04N 19/149* (2014.11); *H04N 19/46* (2014.11); *H04N 19/70* (2014.11)

(58) Field of Classification Search
CPC .. H04N 21/236; H04N 19/132; H04N 19/149; H04N 19/46; H04N 19/70; H04N 19/44; H04N 19/625; H04N 19/63
USPC ...................................................... 375/240.18
See application file for complete search history.

(56) References Cited

U.S. PATENT DOCUMENTS

| | | | | |
|---|---|---|---|---|
| 5,416,854 | A | 5/1995 | Fukuda et al. | |
| 5,832,124 | A | 11/1998 | Sato et al. | |
| 6,134,571 | A | 10/2000 | Kresch et al. | |
| 6,157,676 | A | 12/2000 | Takaoka et al. | |
| 6,529,634 | B1 | 3/2003 | Thyagarajan et al. | |
| 6,584,225 | B1 | 6/2003 | Moroney | |
| 6,876,704 | B2 | 4/2005 | LaRocca et al. | |
| 6,996,595 | B2 | 2/2006 | LaRocca et al. | |
| 7,720,148 | B2 | 5/2010 | Au et al. | |
| 8,121,190 | B2 | 2/2012 | Li | |
| 8,699,810 | B2 | 4/2014 | Reznik | |
| 11,523,129 | B2 * | 12/2022 | Zhao | H04N 19/119 |
| 11,538,198 | B2 * | 12/2022 | Lim | G06T 9/007 |
| 2002/0176118 | A1 | 11/2002 | LaRocca et al. | |
| 2002/0181027 | A1 | 12/2002 | LaRocca et al. | |
| 2002/0186765 | A1 | 12/2002 | Morley et al. | |
| 2002/0191695 | A1 | 12/2002 | Irvine et al. | |
| 2003/0007698 | A1 | 1/2003 | Govindaswamy et al. | |
| 2006/0029282 | A1 | 2/2006 | Meeker | |
| 2006/0251330 | A1 * | 11/2006 | Toth | H04N 19/149 375/E7.113 |
| 2006/0291556 | A1 | 12/2006 | Watanabe et al. | |
| 2007/0092146 | A1 | 4/2007 | Alvarez et al. | |
| 2007/0121728 | A1 | 5/2007 | Wang et al. | |
| 2008/0013633 | A1 | 1/2008 | Ye et al. | |
| 2008/0031336 | A1 | 2/2008 | Yamaguchi | |
| 2008/0065896 | A1 | 3/2008 | Johnson et al. | |
| 2008/0075377 | A1 | 3/2008 | Topiwala et al. | |
| 2008/0107348 | A1 * | 5/2008 | Nurminen | H04N 19/126 375/E7.14 |
| 2008/0192838 | A1 * | 8/2008 | Chen | H04N 19/46 375/E7.2 |
| 2008/0193032 | A1 | 8/2008 | Segall | |
| 2009/0060049 | A1 | 3/2009 | Chuang | |
| 2009/0238271 | A1 * | 9/2009 | Kim | H04N 19/147 375/E7.243 |
| 2011/0249749 | A1 | 10/2011 | Takahashi et al. | |
| 2011/0286516 | A1 | 11/2011 | Lim et al. | |
| 2012/0082244 | A1 | 4/2012 | Chen et al. | |
| 2012/0163450 | A1 | 6/2012 | Davies et al. | |
| 2013/0034153 | A1 | 2/2013 | Song et al. | |
| 2013/0034154 | A1 | 2/2013 | Song et al. | |
| 2013/0051453 | A1 | 2/2013 | Sole et al. | |
| 2013/0101033 | A1 | 4/2013 | Joshi et al. | |
| 2013/0107959 | A1 | 5/2013 | Park et al. | |
| 2014/0044367 | A1 | 2/2014 | Lim et al. | |
| 2015/0312588 | A1 | 10/2015 | Yamamoto et al. | |
| 2019/0007681 | A1 | 1/2019 | Tsai et al. | |
| 2021/0375007 | A1 | 12/2021 | Lim et al. | |
| 2022/0094960 | A1 | 3/2022 | Yamamoto et al. | |
| 2023/0267649 | A1 | 8/2023 | Lim et al. | |

FOREIGN PATENT DOCUMENTS

| | | | |
|---|---|---|---|
| EP | 0714212 | A2 | 5/1996 |
| JP | 05022715 | | 1/1993 |
| KR | 1020080026463 | A | 3/2008 |
| WO | 2007038727 | A2 | 4/2007 |
| WO | 2008035842 | A1 | 3/2008 |

OTHER PUBLICATIONS

Chinese Patent Office, Application No. 200980148528.0, Office Action dated Sep. 4, 2013.
De Natale et al., "Adaptive DCT For Image-Data Compression", European Transactions On Telecommunications And Related Technologies, vol. 3, No. 4, Jul./Aug. 1992, pp. 359-366.
Denying Institution Of Inter Partes Review Of U.S. Pat. No. 11,176,711 (PTAB Case No. IPR2022-01508).
European Patent Office, Application No. 09818025.0, Extended European Search Report dated Feb. 19, 2014.
Jain, Anil K., "Fundamentals Of Digital Image Processing", Prentice Hall Information And System Sciences Series, 1989.
Kim et al., "Illumination Compensation For Multi-View Video Coding", University Of Southern California, Apr. 2006 (pp. 1-4, In English).
Lim et al., Alternative Transform For Residual Blocks In H.264/AVC IEICE Trans. Fundamentals, vol. E91, No. 8, Aug. 2008.
Park et al., "Joint Video Team (JVT) Of ISO/IEC MPEG & ITU-T VCEG (ISO/IEC JTC1/Sc29/WG 11 And ITU-T SG16 Q.6)", 26th Meeting: Antalya, TR, Jan. 13-18, 2018.
Petition For Inter Partes Review Of U.S. Pat. No. 11,176,711 (PTAB Case No. IPR2022-01508).
Poynton, Charles, "Digital Video And HDTV Algorithms And Interfaces", The Morgan Kaufmann Series In Computer Graphics And Geometric Modeling Series, 2003.
Richardson, Iain E., "The H.264 Advanced Video Compression Standard", Second Edition, 2010.
Sullivan et al., "Rate-Distortion Optimization For Video Compression", IEEE Signal Processing Magazine, vol. 15, No. 6, Nov. 1998, pp. 74-903.
U.S. Appl. No. 14/045,511, Final Office Action dated Feb. 20, 2018.
U.S. Appl. No. 13/128,995, Advisory Action dated Jan. 23, 2015.
U.S. Appl. No. 13/128,995, Advisory Action dated Feb. 10, 2016.
U.S. Appl. No. 13/128,995, Advisory Action dated Jun. 29, 2017.
U.S. Appl. No. 13/128,995, Advisory Action dated May 1, 2018.
U.S. Appl. No. 13/128,995, Final Office Action dated Sep. 4, 2014.
U.S. Appl. No. 13/128,995, Final Office Action dated Nov. 25, 2015.
U.S. Appl. No. 13/128,995, Final Office Action dated Aug. 17, 2016.
U.S. Appl. No. 13/128,995, Final Office Action dated Apr. 13, 2017.
U.S. Appl. No. 13/128,995, Final Office Action dated Feb. 22, 2018.
U.S. Appl. No. 13/128,995, Non-Final Office Action dated Jan. 27, 2014.
U.S. Appl. No. 13/128,995, Non-Final Office Action dated May 21, 2015.
U.S. Appl. No. 13/128,995, Non-Final Office Action dated Dec. 16, 2016.

(56) References Cited

OTHER PUBLICATIONS

U.S. Appl. No. 13/128,995, Non-Final Office Action dated Sep. 7, 2017.
U.S. Appl. No. 13/128,995, Non-Final Office Action dated Jun. 6, 2018.
U.S. Appl. No. 14/045,511, Advisory Action dated Jan. 23, 2015.
U.S. Appl. No. 14/045,511, Advisory Action dated Feb. 4, 2016.
U.S. Appl. No. 14/045,511, Advisory Action dated Jul. 13, 2017.
U.S. Appl. No. 14/045,511, Advisory Action dated Dec. 31, 2018.
U.S. Appl. No. 14/045,511, Final Office Action dated Sep. 4, 2014.
U.S. Appl. No. 14/045,511, Final Office Action dated Nov. 3, 2015.
U.S. Appl. No. 14/045,511, Final Office Action dated Aug. 19, 2016.
U.S. Appl. No. 14/045,511, Final Office Action dated Apr. 13, 2017.
U.S. Appl. No. 14/045,511, Final Office Action dated Nov. 1, 2018.
U.S. Appl. No. 14/045,511, Non-Final Office Action dated Jan. 27, 2014.
U.S. Appl. No. 14/045,511, Non-Final Office Action dated May 22, 2015.
U.S. Appl. No. 14/045,511, Non-Final Office Action dated Apr. 21, 2016.
U.S. Appl. No. 14/045,511, Non-Final Office Action dated Dec. 14, 2016.
U.S. Appl. No. 14/045,511, Non-Final Office Action dated Oct. 5, 2017.
U.S. Appl. No. 14/045,511, Non-Final Office Action dated Jun. 5, 2018.
U.S. Appl. No. 14/045,511, Notice of Allowance dated Jul. 21, 2021.
U.S. Appl. No. 17/397,851, Notice of Allowance dated Aug. 24, 2022.
Vladimir Britanak, "Discrete Cosine And Sine Transforms" The Transform And Data Compression Handbook Ed. K. R. Rao et al. Boca Raton, CRC Press LLC, 2001.
World Intellectual Property Organization, Application No. PCT/KR2009/005675, International Search Report dated Nov. 5, 2012.
U.S. Appl. No. 17/990,584, Advisory Action dated Jun. 10, 2024.
U.S. Appl. No. 17/990,584, Final Office Action dated Mar. 27, 2024.
U.S. Appl. No. 17/990,584, Final Office Action dated Oct. 16, 2024.
U.S. Appl. No. 17/990,584, Non-Final Office Action dated Dec. 13, 2023.
U.S. Appl. No. 17/990,584, Non-Final Office Action dated Jul. 3, 2024.
U.S. Appl. No. 17/990,584, Notice of Allowance dated Feb. 5, 2025.

* cited by examiner

FIG. 4

| QP | $MF_{(i,j)}$ | | |
|---|---|---|---|
| | LOCATION AT (1,1), (1,3), (3,1), AND (3,3) | LOCATION AT (0,0), (0,2), (2,0), AND (2,2) | LOCATION AT OTHER 4X4 MATRICES |
| 0 | 13107 | 5243 | 8066 |
| 1 | 11916 | 4660 | 7490 |
| 2 | 10082 | 4194 | 6554 |
| 3 | 9362 | 3647 | 5825 |
| 4 | 8192 | 3355 | 5243 |
| 5 | 7282 | 2893 | 4559 |

FIG. 5

| QP | $MF_{(i,j)}$ | | | | | |
|---|---|---|---|---|---|---|
| | LOCATION AT (I,J), I=[3,7] AND J=[3,7] | LOCATION AT (I,J), I=[0,2,4,6] AND J=[0,2,4,6] | LOCATION AT (I,J), I=[1,5] AND J=[1,5] | LOCATION AT (I,J), (I=[3,7], J=[0,2,4,6]) ∩ (I=[0,2,4,6], J=[3,7]) | LOCATION AT (I,J), (I=[3,7], J=[1,5]) ∩ (I=[1,5], J=[3,7]) | LOCATION AT (I,J), (I=[1,5], J=[0,2,4,6]) ∩ (I=[0,2,4,6], J=[1,5]) |
| 0 | 13107 | 11428 | 20972 | 12222 | 16777 | 15481 |
| 1 | 11916 | 10826 | 19174 | 11058 | 14980 | 14290 |
| 2 | 10082 | 8943 | 15978 | 9675 | 12710 | 11985 |
| 3 | 9362 | 8228 | 14913 | 8931 | 11984 | 11259 |
| 4 | 8192 | 7346 | 13159 | 7740 | 10486 | 9777 |
| 5 | 7282 | 6428 | 11570 | 6830 | 9118 | 8640 |

FIG. 6

| QP | $SF_{(i,j)}$ | | |
| --- | --- | --- | --- |
| | LOCATION AT (1,1), (1,3), (3,1), AND (3,3) | LOCATION AT (0,0), (0,2), (2,0), AND (2,2) | LOCATION AT OTHER 4X4 MATRICES |
| 0 | 10 | 16 | 13 |
| 1 | 11 | 18 | 14 |
| 2 | 13 | 20 | 16 |
| 3 | 14 | 23 | 18 |
| 4 | 16 | 25 | 20 |
| 5 | 18 | 29 | 23 |

FIG. 7

| QP | $SF_{(i,j)}$ | | | | | |
|---|---|---|---|---|---|---|
| | LOCATION AT (I,J), I=[3,7] AND J=[3,7] | LOCATION AT (I,J), I=[0,2,4,6] AND J=[0,2,4,6] | LOCATION AT (I,J), I=[1,5] AND J=[1,5] | LOCATION AT (I,J), (I=[3,7], J=[0,2,4,6]) ∩ (I=[0,2,4,6], J=[3,7]) | LOCATION AT (I,J), (I=[3,7], J=[1,5]) ∩ (I=[1,5], J=[3,7]) | LOCATION AT (I,J), (I=[1,5], J=[0,2,4,6]) ∩ (I=[0,2,4,6], J=[1,5]) |
| 0 | 20 | 18 | 32 | 19 | 25 | 24 |
| 1 | 22 | 19 | 35 | 21 | 28 | 26 |
| 2 | 26 | 23 | 42 | 24 | 33 | 31 |
| 3 | 28 | 25 | 45 | 26 | 35 | 33 |
| 4 | 32 | 28 | 51 | 30 | 40 | 38 |
| 5 | 36 | 32 | 58 | 34 | 46 | 43 |

FIG. 9

| | | | | | | | |
|---|---|---|---|---|---|---|---|
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 1 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

(a)

| | | | | | | | |
|---|---|---|---|---|---|---|---|
| 0 | 0 | 0 | 1 | 0 | 0 | 0 | 0 |
| 0 | 0 | 1 | 0 | 0 | 0 | 1 | 0 |
| 0 | 0 | 1 | 1 | 0 | 0 | 0 | 1 |
| 0 | 0 | 1 | 0 | 0 | 1 | 0 | 1 |
| 0 | 0 | 0 | 0 | 0 | 0 | 0 | 0 |
| 0 | 0 | 0 | 1 | 0 | 0 | 0 | 1 |
| 0 | 0 | 1 | 1 | 0 | 1 | 1 | 0 |
| 0 | 1 | 0 | 0 | 0 | 1 | 0 | 0 |

(b)

FIG. 11

| macroblock layer() { | C | Descriptor |
|---|---|---|
| mb type | 2 | ue(v) l ae(v) |
| if(mb type==I PCM) { | | |
| while( !byte aligned() ) | | |
| pcm alignment zero bit | 2 | f(1) |
| for(i = 0;i<256*ChromaFormatFactor;i++) | | |
| pcm byte[i] | 2 | u(8) |
| } else { | | |
| if( MbPartPredMode(mb_type,0) !=Intra_4x4 && MbPartPredMode(mb_type,0) !=Intra_16x16 && NumMbPart(mb type) == 4 | | |
| sub mb pred(mb type) | 2 | |
| else | | |
| mb pred(mb type) | 2 | |
| if(MbPartPredMode(mb type,0) !=Intra 16x16) | | |
| coded block pattren | 2 | me(v) l ae(v) |
| if(CodedBlockPatternLuma > 0 l l CodedBlockPatternChroma > 0 l l MbPartPredMode(mb type,0) == Intra 16x16) { | | |
| mb qp delta | 2 | se(v) l ae(v) |
| if(CodedBlockPatternLuma > 0 && NumMbPart(mb type)!=4) | | |
| mb alternative transform flag | 2 | u(1) l ae(v) |
| else if( NumMbPart(mb type) == 4) { | | |
| for( i8x8 = 0;i8x8 < 4; i8x8++) { | | |
| if( CodedBlockPatternLuma & (1<<i8x8) ) | | |
| submb alternative transform flag | 2 | u(1) l ae(v) |
| } | | |
| } | | |
| residual() | 3/4 | |
| } | | |
| } | | |
| } | | |

1110

FIG. 12

| Since_header() { | C | Descriptor |
| --- | --- | --- |
| ..... | ..... | ..... |
| If(num_slice_groups_minus1 > 0 && slice_group_map_type >= 3 && slice_group_map_type<=5) | | |
| slice group change cycle | 2 | u(v) |
| slice alternative transform flag | 2 | u(1) |
| } | | |

1210

APPARATUS AND METHOD FOR CODING/DECODING IMAGE SELECTIVELY USING DISCRETE COSINE/SINE TRANSFORM

CROSS-REFERENCE TO RELATED APPLICATIONS

This application is a continuation of U.S. patent application Ser. No. 19/059,053, filed on Feb. 20, 2025, which is a continuation of U.S. patent application Ser. No. 17/990,584 filed on Nov. 18, 2022, now issued as U.S. Pat. No. 12,260,599 on Mar. 25, 2025, which is a continuation of U.S. patent application Ser. No. 17/397,851 filed on Aug. 9, 2021, now issued as U.S. Pat. No. 11,538,198 on Dec. 27, 2022, which is a continuation of U.S. patent application Ser. No. 14/045,511 filed on Oct. 3, 2013, now issued as U.S. Pat. No. 11,176,711 on Nov. 16, 2021, which is a continuation of U.S. patent application Ser. No. 13/128,995 filed on May 12, 2011, which is a National Stage application of International Application No. PCT/KR2009/005675 filed Oct. 5, 2009, which claims benefit under 35 U.S.C. § 119(a) of Korean Patent Applications Nos. 10-2008-0097144 filed on Oct. 2, 2008, and 10-2009-0093127 filed on Sep. 30, 2009 in the Korean Intellectual Property Office, the contents of all of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates to a technology for coding/decoding an image.

BACKGROUND OF THE INVENTION

Generally, a motion image coding method is classified into an intra-coding that performs coding of intra-image, such as an intra (I) frame, and an inter-coding that performs coding between images, such as a predictive (P) frame or a bidirectional (B) frame.

According to an image compression standard, such as H.263, M PEG-4 Part 2, H.264/M PEG-4 AVC, and the like, a motion estimation is performed based on a block unit. That is, the motion estimation may be performed based on a macroblock unit or based on a sub-block unit that is obtained by dividing the macroblock unit into two or four. The motion estimation may be performed to reduce a bit rate by eliminating a temporal redundancy occurring when a motion image is coded. Particularly, H 0.264/M PEG-4 AVC uses various size of variable block-based motion estimation, thereby having a high coding efficiency.

A prediction of a motion vector may be performed with reference to either a past image based on a time axis or both the past image and a future image. A n image used as a reference when performing coding or decoding of a current frame may be referred to as a reference image. The H.264/M PEG-4 AVC supports a multiple reference frames, and thus, H.264/M PEG-4 AVC selects a block of a frame having a highest redundancy with the current block as the reference image, thereby having a greater coding efficiency than when a previous frame is only used as the reference image. Also, the H.264/M PEG-4 AVC uses a rate-distortion optimization technology to select an optimum mode from among every possible coding mode used for the motion estimation, such as the variable block mode, a space prediction mode (Intra 16×16, Intra 8×8, Intra 4×4), a SKIP mode (P_SKIP mode and B_SKIP mode), a DIRECT mode, and the like, thereby further improving the coding efficiency of the H.264/M PEG-4 AVC.

According to the H.264/M PEG-4 AVC used for encoding and decoding motion image data, a transform is used as a method of increasing a compression rate of energy and decreasing a spatial correlation of a residual signal in a block after inter/intra image prediction is performed, and quantization is used for decreasing an energy of a transformed coefficient after the transform is performed and for increasing the compression rate.

BRIEF DESCRIPTION OF DRAWINGS

FIG. 4 is a diagram illustrating a value of a multiplication factor in a quantizing process with respect to a 4×4 block-sized image;

FIG. 5 is a diagram illustrating a value of a multiplication factor in a quantizing process with respect to an 8×8 blocksized image;

FIG. 6 is a diagram illustrating a value of a scaling factor in an inverse-quantizing process with respect to a 4×4 sized image;

FIG. 7 is a diagram illustrating a value of a scaling factor in an inverse-quantizing process with respect to an 8×8 sized image;

FIG. 9 is a diagram illustrating a concept of a coefficient threshold operation according to an exemplary embodiment of the present invention;

FIG. 11 is a diagram illustrating an exemplary embodiment of storing information about a transform scheme in a macro block header;

FIG. 12 is a diagram illustrating an exemplary embodiment of the present invention of storing, in a slice header, information about whether the present invention is applied;

BRIEF SUMMARY OF INVENTION

Figure 1:
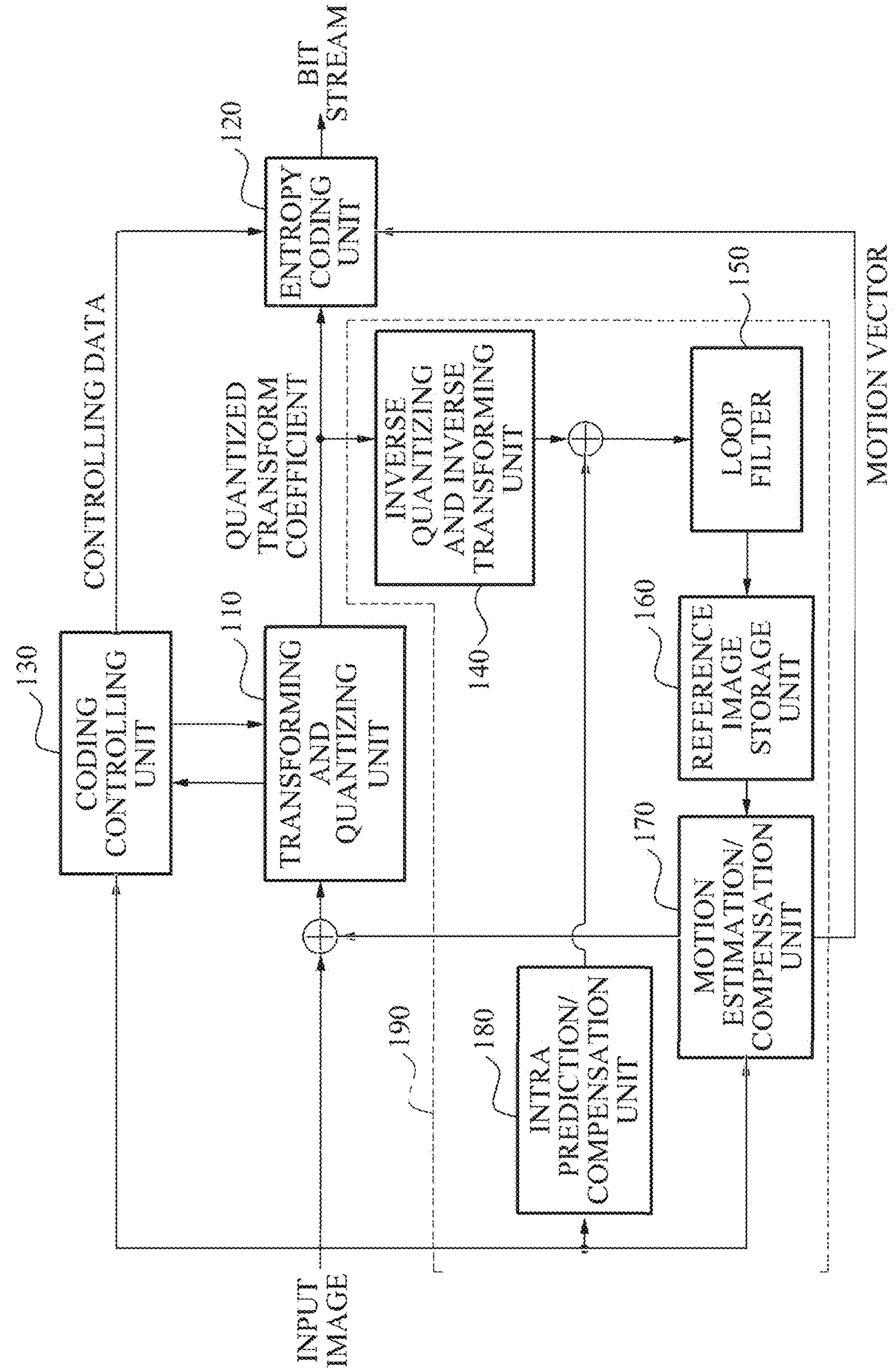
FIG. 1 is a block diagram illustrating an exemplary embodiment of an image coding apparatus where the present invention is applied.

An aspect of the present invention provides a method of increasing a compression rate of an image block when a quantized transform coefficient is generated, through a transform and quantization after performing prediction of inter/intra image with respect to a predetermined sized of block (macroblock).

According to an aspect of an exemplary embodiment, there is provided an apparatus of coding an image, including a first transforming unit to transform a target image into a first transform coefficient based on a discrete cosine transform (DCT) scheme, a second transforming unit to transform the target image into a second transform coefficient based on a discrete sine transform (DST) scheme, and a transform scheme determining unit to select one of the first transform coefficient and the second coefficient as a transform coefficient of the target image.

According to another aspect of an exemplary embodiment, there is provided an apparatus of decoding an image, including a transform scheme decision unit to decide a transform scheme with respect to a transform coefficient, a first inverse transforming unit to generate a decoded image with respect to the transform coefficient by using a discrete cosine inverse transform scheme, when the transform scheme is a DCT, and a second inverse transforming unit to generate the decoded image with respect to the transform coefficient by using a discrete sine inverse transform scheme, when the transform scheme is a DST.

According to another aspect of an exemplary embodiment, there is provided an apparatus of coding an image, including a first transforming unit to generate a first transform coefficient by performing a DCT with respect to a target image, a second transforming unit to generate a second transform coefficient by performing a DST with respect to the target image, and a transform scheme determining unit to select one of the first transform coefficient and the second transform coefficient as a transform coefficient with respect to the target image.

According to the present invention, a compression rate of an image block increases when a quantized transform coefficient is generated, through a transform and quantization after performing prediction of inter/intra image with respect to a predetermined sized of block (macroblock).

DETAILED DESCRIPTION OF THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating an exemplary embodiment of an image coding apparatus where the present invention is applied.

The image coding apparatus includes a transforming and quantizing unit 110, an entropy coding unit 120, a coding controlling unit 130, an inverse-quantizing and inverse-transforming unit 140, a loop filter 150, a reference image storage unit 160, a motion estimation/compensation unit 170, and intra prediction/compensation unit 180.

Generally, a coding apparatus may include an encoding process and a decoding process, and a decoding apparatus includes a decoding process. The decoding process of the decoding apparatus is the same as a decoding process of the coding apparatus. Accordingly, hereinafter, the coding apparatus will be mainly described.

The motion estimation/compensation unit 170 and the intra prediction/compensation unit 180 may generate a prediction image with respect to an input image. The motion estimation/compensation unit 170 and the intra prediction/compensation unit 180 may generate the prediction image with respect to the input image based on a reference image with respect to the input image. The reference image storage unit 160 may store the reference image with respect to the input image. A difference between the input image and the prediction image is a residual image. According to an exemplary embodiment of the present invention, the image coding apparatus may improve a coding efficiency higher compared to when the input image is coded by coding the residual image. That is, the residual image may be used as a target image of the image coding apparatus.

The target image may be inputted to the transforming and quantizing unit 110. The transforming and quantizing unit 110 may generate a first transform coefficient by performing a discrete cosine transform (DCT), quantization, and coefficient threshold operation on the target image. Also, the transforming and quantizing unit 110 may generate a second transform coefficient by performing a discrete sine transform (DST), quantization, and the coefficient threshold operation on the target image. The entropy coding unit 120 may generate a bit stream by entropy coding with respect to the discrete cosine transformed first transform coefficient or the discrete sine transformed second transform coefficient. In this instance, the coding controlling unit 130 performs an inverse-quantization and a discrete cosine inverse transform on the first transform coefficient, and performs an inverse-quantization and a discrete sine inverse transform on the second transform coefficient, thereby determining an optimum transform scheme. The coding controlling unit 130 may transmit the determined transform scheme to the transforming and quantizing unit 110.

Referring to the decoding process 190, the inverse quantizing and inverse transforming unit 140 may perform inverse quantizing and a discrete cosine inverse transform on the first transform coefficient to generate a decoded image with respect to the first transform coefficient, and may perform inverse quantizing and a discrete sine inverse transform on the second transform coefficient to generate a decoded image with respect to the second transform coefficient. The loop filter 150 may perform low pass filtering with respect to each decoded image and may smooth a block boundary. The reference image storage unit 160 may store the decoded image in which the block boundary is smoothed, as the reference image.

In a case of an inter mode, the motion compensation unit 170 may compensate for a motion by comparing the stored reference image with the input image. In a case of an intra mode, the intra prediction/compensation unit 180 may perform intra compensation without passing through the loop filter 150 and the reference image storage unit 160.

Figure 2:
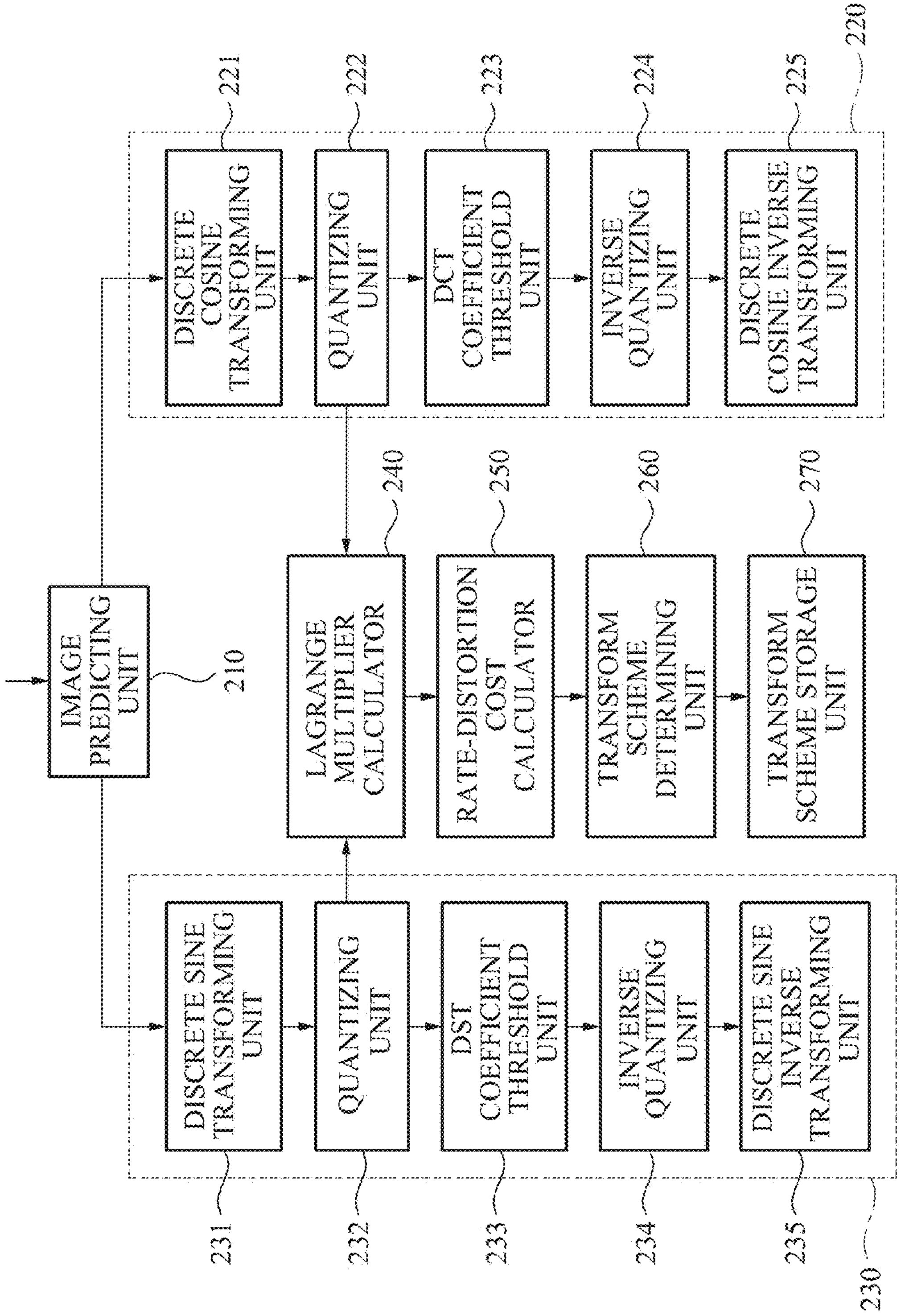
FIG. 2 is a block diagram illustrating a configuration of an image coding apparatus according to an exemplary embodiment of the present invention.

FIG. 2 is a block diagram illustrating a configuration of an image coding apparatus according to an exemplary embodiment of the present invention.

An image predicting unit 210 may generate a prediction image with respect to an input image based on a reference image with respect to the input image. The image predicting unit 210 may calculate a difference between the input image and the prediction image, as a target image.

A first transforming unit 220 may transform the target image into a first transform coefficient based on a DCT scheme. The first transforming unit 220 may include a discrete cosine transforming unit 221 and a quantizing unit 222.

The discrete cosine transforming unit 221 may perform a DCT on the target image to generate a first image coefficient.

The quantizing unit 222 may quantize the first image coefficient to generate the first transform coefficient.

A second transforming unit 230 may transform the target image into a second transform coefficient based on a DST. The second transforming unit 230 may include the discrete sine transforming unit 231 and a quantizing unit 232.

Operations of the discrete cosine transforming unit 221 and the quantizing unit 222 included in the first transforming unit 220 are similar to operations of the discrete sine transforming unit 231 and the quantizing unit 232 included in the second transforming unit 230, and thus, hereinafter, the operation of the second transforming unit 230 will be described in detail.

The discrete sine transforming unit 231 may generate a second image coefficient by performing the DST on the target image. The quantizing unit 232 may quantize the second image coefficient to generate a second transform coefficient.

According to an exemplary embodiment, the discrete sine transforming unit 231 may perform the DST on the target image based on Equation 1 as below.

[Equation 1]

$$Y(k)=\sqrt{\frac{2}{N+1}}\sum_{n=0}^{N-1}X(n)\sin\frac{\pi(k+1)(n+1)}{N+1},\ 0\le k\le N-1$$

Here, X indicates the target image to be discrete sine transformed, and Y indicates the second image coefficient that is discrete sine transformed. Also, N is a unit size of the DST.

When the target image is a 4×4 sized image, the DST of Equation 1 may be expressed as a matrix of Equation 2 below.

[Equation 2]

$$Y=SXS=\left(\begin{bmatrix} a & b & b & a\\ b & a & -a & -b\\ b & -a & -a & b\\ a & -b & b & -a\end{bmatrix}[X]\begin{bmatrix} a & b & b & a\\ b & a & -a & -b\\ b & -a & -a & b\\ a & -b & b & -a\end{bmatrix}\right)$$

S indicates a DST matrix with respect to each row of X, X indicates the target image, and Y indicates the inverse-quantized second image coefficient. Also, elements a and b in the matrix indicate constants $$\sqrt{\frac{2}{5}}\sin\left(\frac{\pi}{5}\right)\text{ and }\sqrt{\frac{2}{5}}\sin\left(\frac{2}{5}\pi\right),$$

respectively.

The elements a and in the matrix are not integers, and thus, a calculation process is extremely complex when a calculation is actually performed. According to an exemplary embodiment, the discrete sine transforming unit 231 may perform an integer sine transform on the target image based on an integer sine transform matrix obtained from the DST matrix. The integer sine transform may be expressed as given in Equation 3 below.

[Equation 3]

$$Y=S_fXS_f^T=\left(\begin{bmatrix} 1 & 2 & 2 & 1\\ 1 & 1 & -1 & -1\\ 2 & -1 & -1 & 2\\ 1 & -1 & 1 & -1\end{bmatrix}[X]\begin{bmatrix} 1 & 1 & 2 & 1\\ 2 & 1 & -1 & -1\\ 2 & -1 & -1 & 1\\ 1 & -1 & 2 & -1\end{bmatrix}\right)$$

Figure 3:
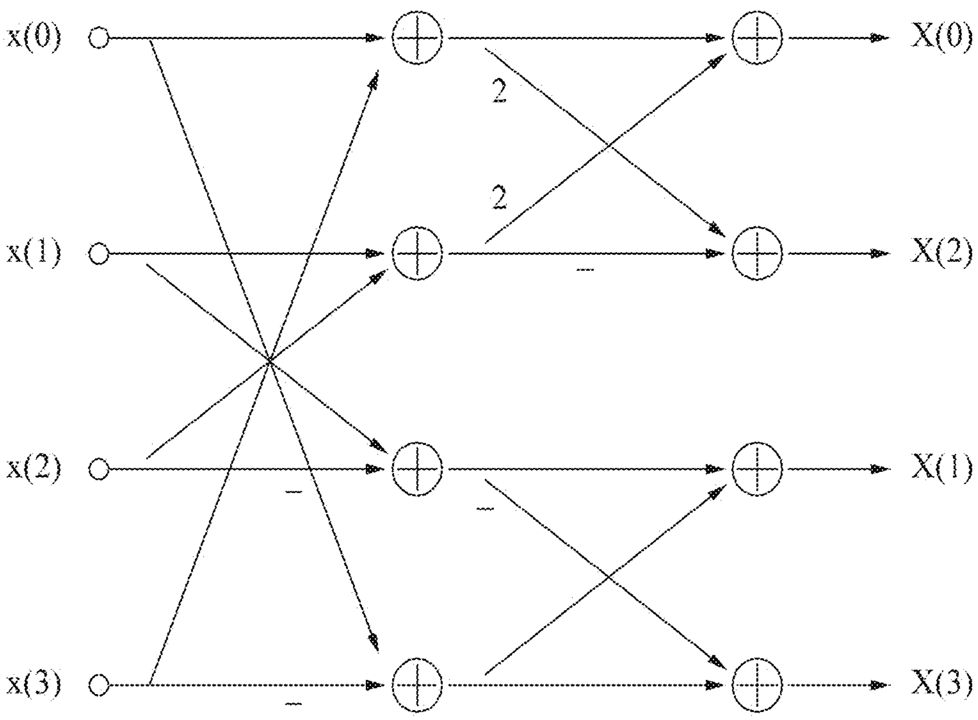
FIG. 3 is a diagram illustrating a concept of an integer sine transform according to an exemplary embodiment of the present invention.

FIG. 3 is a diagram illustrating a concept of an integer sine transform according to an exemplary embodiment of the present invention.

When a target image is in a size of 4×4, the integer sine transform of Equation 3 may be easily performed according to the exemplary embodiment of FIG. 3.

When the target image is in a size of 8×8, the DST of Equation 1 may be expressed as given in Equation 4 below.

[Equation 4]

$$Y=S_fXS_f^T=$$

$$\begin{bmatrix} 0.375 & 0.75 & 1.25 & 1.5 & 1.5 & 1.25 & 0.75 & 0.375\\ 0.5 & 1 & 1 & 0.5 & -0.5 & -1 & -1 & -0.5\\ 0.75 & 1.5 & 0.375 & -1.25 & -1.25 & 0.375 & 1.5 & 0.75\\ 1 & 1 & -1 & -1 & 1 & 1 & -1 & -1\\ 1.25 & 0.375 & -1.5 & 0.75 & 0.75 & -1.5 & 0.375 & 1.25\\ 1 & -0.5 & -0.5 & 1 & -1 & 0.5 & 0.5 & -1\\ 1.5 & -1.25 & 0.75 & -0.375 & -0.375 & 0.75 & -1.25 & 1.5\\ 1 & -1 & 1 & -1 & 1 & -1 & 1 & -1\end{bmatrix}.$$

$$[X]\begin{bmatrix} 0.375 & 0.5 & 0.75 & 1 & 1.25 & 1 & 1.5 & 1\\ 0.75 & 1 & 1.5 & 1 & 0.375 & -0.5 & -1.25 & -1\\ 1.25 & 1 & 0.375 & -1 & -1.5 & -0.5 & 0.75 & 1\\ 1.5 & 0.5 & -1.25 & -1 & 0.75 & 1 & -0.375 & -1\\ 1.5 & -0.5 & -1.25 & 1 & 0.75 & -1 & -0.375 & 1\\ 1.25 & -1 & 0.375 & 1 & -1.5 & 0.5 & 0.75 & -1\\ 0.75 & -1 & 1.5 & -1 & 0.375 & 0.5 & -1.25 & 1\\ 0.375 & -0.5 & 0.75 & -1 & 1.25 & -1 & 1.5 & -1\end{bmatrix}$$

The quantizing unit 232 may generate a second transform coefficient by quantizing a second image coefficient. According to an exemplary embodiment, when the target image is in the size of 4×4, the quantizing unit 232 may quantize the second image coefficient based on Equation 5 or Equation 6 as below.

[Equation 5]

$$Z_{(i,j)}=\text{round}\left(\frac{Y_{(i,j)}}{QStep}\right)$$

[Equation 6]

$$Z_{(i,j)}=\text{sgn}(Y_{(i,j)})\cdot(|Y_{(i,j)}|\cdot MF_{(i,j)}+DZ)\gg(15+Q_D)$$

$Y_{(i,j)}$ indicates a second image coefficient that is integer sine transformed at (i,j) of the 4×4 matrix, and $Z_{(i,j)}$ is a second transform coefficient that is generated by quantizing a second transform coefficient at the (i,j) of the 4×4 matrix. $Q_D$ indicates a value of $$\left\lfloor\frac{QP}{6}\right\rfloor,$$

and QP indicates a quantization parameter. $MF_{(i,j)}$ indicates a multiplication factor. QStep indicates a step size of a quantizing unit, and round( ) indicates a rounding-off function. DZ performs a function of adjusting a dead zone during a quantizing process and a value of which is selected between 0 and ½. sgn(•) is a sign function.

FIG. 4 is a diagram illustrating a value of a multiplication factor in a quantizing process with respect to a 4×4 sized image.

According to an exemplary embodiment, when a target image is in a size of 8×8, the quantizing unit 232 may quantize a second image coefficient based on Equation 7 to generate a second transform coefficient.

$$Z_{(i,j)} = \mathrm{sgn}(Y_{(i,j)}) \cdot (|Y_{(i,j)}| \cdot MF_{(i,j)} + DZ) \gg (16 + Q_D) \quad \text{[Equation 7]}$$

FIG. 5 is a diagram illustrating a value of a multiplication factor in a quantizing process with respect to an 8×8 sized image.

The transform scheme determining unit 260 may select one of a first transform coefficient and a second transform coefficient as a transform coefficient with respect to a target image.

According to an exemplary embodiment, the first transforming unit 220 may generate a first decoded image with respect to the target image based on the first transform coefficient, and the second transforming unit 230 may generate a second decoded image with respect to the target image based on the second transform coefficient. The transform scheme determining unit 260 may select a transform image with respect to the target image by comparing the target image, the first decoded image, and the second decoded image.

According to another exemplary embodiment, the transform scheme determining unit 260 may select the transform image with respect to the target image further based on a number of bits of the first decoded image, a bit rate of the first decoded image, a number of bits of the second decoded image, and a bit rate of the second decoded image. That is, the transform scheme determining unit may select, as the transform coefficient with respect to the target image, a transform coefficient corresponding to a decoded image having a smaller number of bits or a smaller bit rate from among the first decoded image and the second decoded image.

Also, according to another exemplary embodiment, the transform scheme determining unit 260 may select the transform image with respect to the target image further based on a distortion of the first decoded image and a distortion of the second decoded image. As an example, the transform scheme determining unit 260 may select the transform coefficient with respect to the target image based on the distortion of the decoded image together with the bit rate of the decoded image.

The first transforming unit 220 may include a DCT coefficient threshold unit 223, an inverse quantizing unit 224, a discrete cosine inverse transforming unit 225 to generate the first decoded image.

The DCT coefficient threshold unit 223 may perform a coefficient threshold operation on the first transform coefficient. The inverse quantizing unit 224 may perform an inverse-quantization on the coefficient threshold-operated first transform coefficient, and the discrete cosine inverse transforming unit 224 may generate the first decoded image with respect to the target image by performing the discrete cosine inverse transform on the inverse-quantized first transform coefficient. The transform scheme determining unit 260 may select the transform coefficient based on the first decoded image.

The second transforming unit 230 may include the DST coefficient threshold unit 233, the inverse quantizing unit 234, and the discrete sine inverse transforming unit 225.

Operations of the DCT coefficient threshold unit 223, the inverse quantizing unit 224, and a discrete cosine inverse transforming unit 225 included in the first transforming unit 220 are similar to operations of the DST coefficient threshold unit 233, the inverse quantizing unit 234, and the discrete sine inverse transforming unit 225 included in the second transforming unit 230, and thus, hereinafter, the operation of the second transforming unit 230 will be described in detail.

The DST coefficient threshold unit 233 may perform a coefficient threshold operation on the quantized second transform coefficient.

A coefficient threshold operation of the DST coefficient threshold unit 233 will be described in detail with reference to FIG. 9.

The quantized second transform coefficient may calculate costs (a value represented as 3, 2, 1, and 0 in a left side of FIG. 4) with respect to coefficients occurring in each of a 4×4 frequency domain through a coefficient threshold operation of FIG. 9, may calculate a sum of all costs in a 8×8 block unit, may substitute “0” for all the transformed coefficient of the corresponding 8×8 block when the sum of the costs is less than a predetermined threshold, and may determine a CB P with respect to the corresponding block as zero. The sum of the costs may be applicable when an absolute value of the transform coefficient in the corresponding frequency domain is “1”.

In this instance, when an absolute value of a coefficient in a frequency domain is greater than zero, an arbitrary high number may be used as a cost with respect to the corresponding transform coefficient so that all transform coefficients are prevented from being zero in a corresponding 4×4 block unit, an 8×8 block unit, and a macroblock unit.

Also, when a total sum of costs based on a macroblock unit including four 8×8 block is less than a predetermined threshold, all coefficients of the corresponding macroblock are replaced with zero, and a CBP with respect to each of the 8×8 block may be determined as zero.

According to a joint model (JM) that is an H.264/AVC reference model, and an ITU-TVCEGKTA reference model, a fixed constant, 4, is used as a threshold in an 8×8 block unit and a fixed constant, 5, is used as a threshold in a macroblock unit.

In FIG. 9 (*a*), the total sum of all costs of transform coefficients of the 8×8 block is 5, and thus, the all coefficients are not replaced with zero. In FIG. 9 (*b*), the total sum of all costs of transform coefficients of the 8×8 block is zero, and thus, the all coefficients are replaced with zero.

The inverse quantizing unit 234 may perform inverse quantization on the coefficient threshold-operated second transform coefficient. According to an exemplary embodiment, when the target image is a 4×4 block, the inverse quantizing unit 234 may perform inverse quantization on the second transform coefficient based on Equation 8.

$$Y'_{(i,j)} = Z_{(i,j)} \cdot QStep \quad \text{[Equation 8]}$$

$Y'_{(i,j)}$ is an inverse-quantized second transform coefficient, and $SF_{(i,j)}$ is a scaling factor.

FIG. 6 is a diagram illustrating a value of a scaling factor $SF_{(i,j)}$ in an inverse-quantizing process with respect to a 4×4 sized image.

According to exemplary embodiment, when the target image is in a size of 8×8, the inverse quantizing unit 234 may perform inverse quantization on the coefficient threshold-operated second transform coefficient based on Equation 9 as below.

$$Y'_{(i,j)} = (Z_{(i,j)} \cdot SF_{(i,j)}) \ll Q_D \quad \text{[Equation 9]}$$

FIG. 7 is a diagram illustrating a value of a scaling factor $SF_{(i,j)}$ in an inverse-quantizing process with respect to an 8×8 sized image.

The discrete since inverse transforming unit 235 may perform discrete sine inverse transform on the inverse-quantized second transform coefficient and may generate a second decoded image with respect to the target image. According to an exemplary embodiment, the discrete sine inverse transforming unit 235 may generate the second decoded image based on Equation 10 as below.

$$X' = SYS = \left(\begin{bmatrix} a & b & b & a \\ b & a & -a & -b \\ b & -a & -a & b \\ a & -b & b & -a \end{bmatrix} [Y'] \begin{bmatrix} a & b & b & a \\ b & a & -a & -b \\ b & -a & -a & b \\ a & -b & b & -a \end{bmatrix}\right) \quad \text{[Equation 10]}$$

S indicates a discrete sine inverse transform matrix with respect to each row of X, X' indicates a target object, Y' and indicates a inverse-quantized transform coefficient. Also, elements a and b in the matrix indicate constant $$\sqrt{\frac{2}{5}}\sin\left(\frac{\pi}{5}\right) \text{ and } \sqrt{\frac{2}{5}}\sin\left(\frac{2}{5}\pi\right),$$

respectively.

The elements a and b in the matrix are not integer, and thus, a calculation process is extremely complex when calculation is actually executed. According to an exemplary embodiment, the discrete sine inverse transforming unit 235 may perform a integer sine inverse transform on the second decoded image based on a integer sine inverse transform matrix obtained from the integer sine inverse transform matrix. The integer sine inverse transform may be expressed as given in Equation 11 below.

$$X' = S_i^T Y' S_i = \begin{bmatrix} \frac{1}{2} & 1 & 1 & 1 \\ 1 & 1 & -\frac{1}{2} & -1 \\ 1 & -1 & -\frac{1}{2} & 1 \\ \frac{1}{2} & -1 & 1 & -1 \end{bmatrix} [Y'] \begin{bmatrix} \frac{1}{2} & 1 & 1 & \frac{1}{2} \\ 1 & 1 & -1 & -1 \\ 1 & -\frac{1}{2} & -\frac{1}{2} & 1 \\ 1 & -1 & 1 & -1 \end{bmatrix} \quad \text{[Equation 11]}$$

Figure 8:
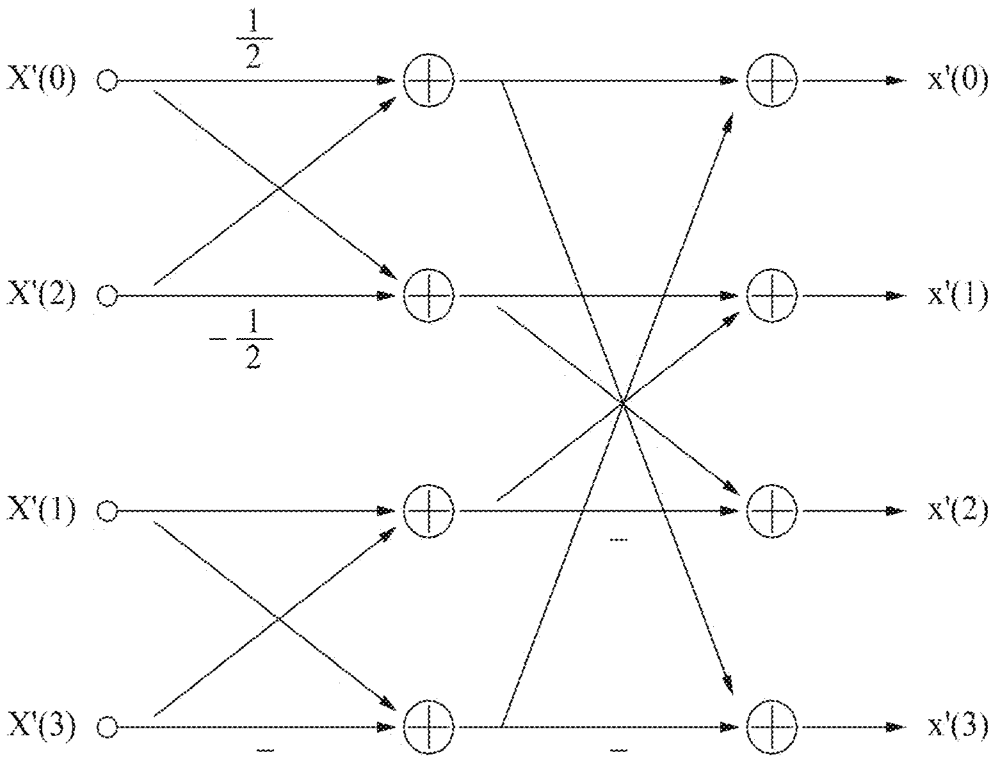
FIG. 8 is a diagram illustrating a concept of integer sine inverse transform according to an exemplary embodiment of the present invention.

FIG. 8 is a diagram illustrating a concept of integer sine transform according to an exemplary embodiment of the present invention.

When a target image is in a size of 4×4, an integer sine inverse transform of FIG. 11 may be performed based on the exemplary embodiment of FIG. 8.

A second decoded image X' generated by a discrete sine inverse transform may be rounded off based on Equation 12 and may be expressed as $$X''_{(i,j)}.$$

$$X''_{(i,j)} = \text{round}\left(X'_{(i,j)}\right) \quad \text{[Equation 12]}$$

Also, a second decoded image X" restored by the integer sine inverse transform may be passed through a post-scaling process based on Equation 13 and may be expressed as $$X''_{(i,j)}.$$

$$X''_{(i,j)} = \text{round}\left(\frac{X'_{(i,j)}}{64}\right) \quad \text{[Equation 13]}$$

A Lagrange multiplier calculator 240 may calculate a Lagrange multiplier of each of a first decoded image and a second decoded image, and a distortion rate measuring unit 250 measures a distortion rate of the first decoded image and a distortion rate of the second decoded image based on each calculated Lagrange multiplier.

According to an exemplary embodiment, in a case of an I-frame or a p-frame, the Lagrange multiplier calculator 240 may calculate a Lagrange multiplier based on Equation 14 as below.

$$\lambda_{MODE,I,P} = C \times 2^{(QP-12)/3} \quad \text{[Equation 14]}$$

C may be determined through an experiment with respect to various images, or may be adaptively determined based on a size of the target image.

According to another exemplary embodiment, in a case of a B-frame, the Lagrange multiplier calculator 240 may calculate a Lagrange multiplier based on Equation 15 as below.

$$\lambda_{MODE,B} = \max\left(2, \min\left(4, \frac{QP-12}{6}\right)\right) \times \lambda_{MODE,I,P} \quad \text{[Equation 15]}$$

The rate-distortion cost calculator 250 may calculate a rate-distortion cost (R-D cost) with respect to the first decoded image and the second decoded image.

According to an exemplary embodiment, the rate-distortion cost calculator 250 may calculate the rate-distortion cost based on Equation 16 as below.

$$J(s, c, \text{MODE} \mid QP, \lambda_{MODE}) = SSD(s, c, \text{MODE} \mid QP) + \lambda_{MODE} \cdot R(s, c, \text{MODE} \mid QP) \quad \text{[Equation 16]}$$

Here, s is a target image and c is a decoded image. SSD(s,c,MODE|QP) is a distortion of each decoded image and R(s,c,MODE|QP) is a number of bits of each decoded image. MODE is a coding mode used for an image coding.

The rate-distortion cost calculator 260 may calculate a rate-distortion cost with respect to each mode to select an optimum mode from among every possible coding mode used for image coding, such as a variable block mode, four types of space prediction mode, a SKIP mode (P_SKIP mode and B_SKIP mode), a DIRECT mode, and the like. That is, the rate-distortion cost calculator 260 may calculate a rate-distortion with respect to each restoration image and each coding mode.

The transform scheme determining unit 260 may select a transform coefficient corresponding to a restoration image having a smallest rate-distortion cost, as a transform coefficient with respect to the target image. That is, the transform scheme determining unit 260 may select an optimum transform scheme based on the distortion of each restoration image and a bit rate required for coding the transform coefficient.

Also, the transform scheme determining unit 260 may determine a mode having a smallest rate-distortion cost as the coding mode. That is, the transform scheme determining unit 260 may select a transform mode having a high compression efficiency as a transform mode with respect to the target image.

The transform scheme storage unit 270 may store information about a transform scheme corresponding to the transform coefficient with respect to the target image. That is, the transform scheme storage unit 270 may store information about whether the target image is discrete cosine transformed or discrete sine transformed, and an image decoding apparatus may determine a transform scheme with respect to the target image based on the information about the transform scheme.

According to an exemplary embodiment, the transform scheme storage unit 270 may represent information about the transform scheme by using a flag bit included in a macro block unit. As an example, when the target image included in a macro block is discrete cosine transformed, the flag bit may be determined as "0". Also, when the target image included in the macro block is discrete sine transformed, the flag bit may be determined as "1".

The transform scheme storage unit 270 may store information about the transform scheme based on CBP value with respect to the transform coefficient. The CBP value, which represents a luminance value of each block, represents "1" when there is a transform coefficient in a corresponding block and represents "0" when there is no transform coefficient in the corresponding block. When there is no transform efficient in a predetermined block, there is no need to determine a transform scheme with respect to the corresponding block, and thus, there is no need to store information about a transform scheme.

Figure 10:
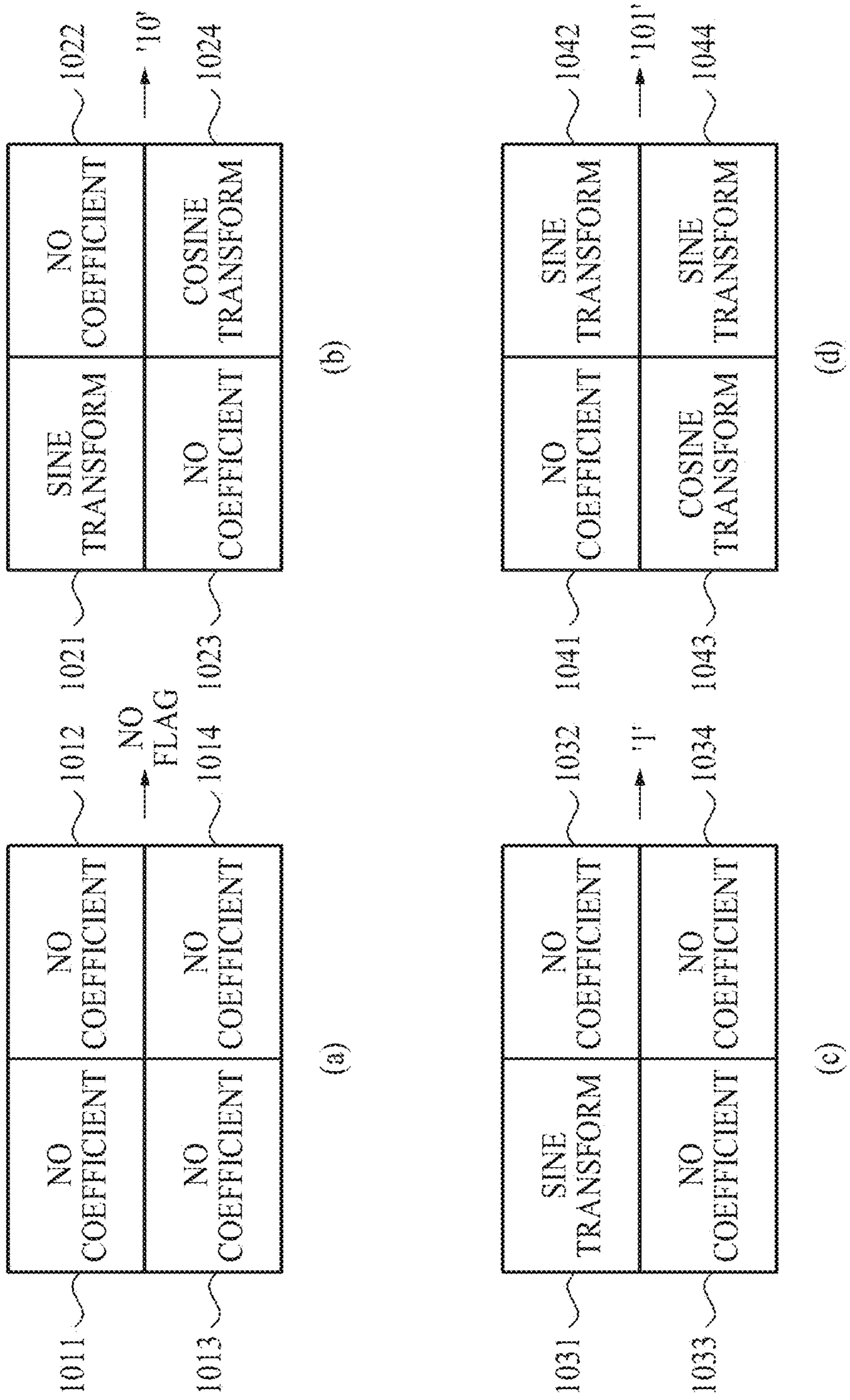
FIG. 10 is a diagram illustrating an exemplary embodiment of storing transform scheme information based on coded block pattern (CBP) according to an exemplary embodiment of the present invention.

FIG. 10 is a diagram illustrating an exemplary embodiment of storing transform scheme information based on coded block pattern (CBP) according to an exemplary embodiment of the present invention.

FIG. 10 (*a*) illustrates an exemplary embodiment that all blocks 1011, 1012, 1013, and 1014 do not include transform coefficients. In this instance, a image decoding apparatus may not need to determine a transform scheme with respect to a transform coefficient for each block. Accordingly, the transform scheme storage unit 270 may not store information about the transform scheme of each block. That is, the transform scheme storage unit 270 may store information about a transform scheme with respect to a corresponding block, only when a CBP with respect to each block is "1".

FIG. 10 (*b*) illustrates an exemplary embodiment that a second block and a third block do not have transform coefficients. A first block 1021 and a fourth block 1024 have transform coefficients, and each of the transform coefficients is discrete sine transformed and discrete cosine transformed respectively.

The transform scheme storage unit 270 may store transform scheme information with respect to each of the first block 1021 and the fourth block 1041 which have corresponding transform coefficients. The first block 1021 is discrete sine transformed, and thus, the information about the transform scheme may be determined as "1". Also, the fourth block 1024 is discrete cosine transformed, and thus, the information about the transform scheme may be determined as "0".

The image decoding apparatus may determine a block corresponding to information about a transform scheme of "10" based on the CBP value coded for each block.

FIG. 10 (*c*) illustrates an exemplary embodiment that a first block 1031 includes a transform coefficient, and a second block 1032, a third block 1033, and a fourth block 1034 do not include transform coefficients. The transform scheme storage unit 270 may store information about a transform scheme with respect to the first block 1031 having the transform coefficient.

FIG. 10 (*d*) illustrates an exemplary embodiment that a first block 1041 does not include a transform coefficient, and a second block 1042, a third block 1043, and a fourth block 1044 include transform coefficients. The transform scheme storage unit 270 may store transform scheme information about transform schemes with respect to the second block 1042, the third block 1043, and the fourth block 1044.

FIG. 11 is a diagram illustrating an exemplary embodiment of storing information about a transform scheme in a macro block header.

Referring to a storage portion 1110 of a macro block head of FIG. 11 that stores information about a transform scheme, the transform scheme storage unit 270 may store the information (alternative transform flag) about the transform scheme, when a CBP is greater than "0".

FIG. 12 is a diagram illustrating an exemplary embodiment of the present invention of storing, in a slice header, information about whether the present invention is applied.

According to an exemplary embodiment, the image coding apparatus may code a target image by applying the present invention, and according to another exemplary embodiment, the image coding apparatus may not apply the present invention. The transform scheme storage unit 270 may store, by using a flag bit of a slice header, information 1210 about whether the present invention is applied, and a image decoding apparatus may determine whether the present invention is applied to a transform coefficient, by using the flag bit.

Figure 13:
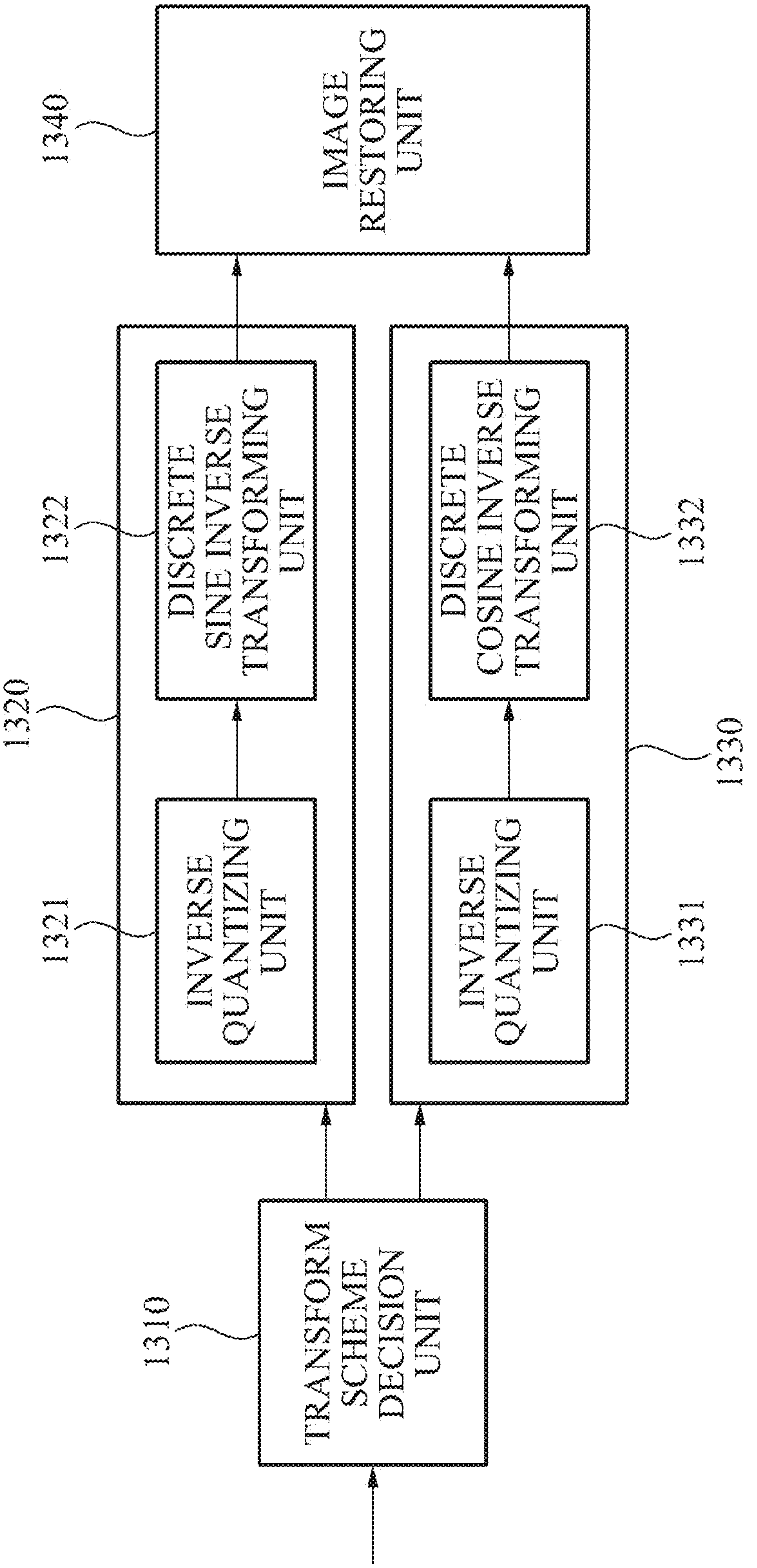
FIG. 13 is a block diagram illustrating a configuration of a image decoding apparatus according to the present invention.

FIG. 13 is a block diagram illustrating a configuration of a image decoding apparatus according to the present invention. The image decoding apparatus according to the present invention includes a transform scheme decision unit 1310, a first inverse transforming unit 1320, and a second inverse transforming unit 1330.

The transform scheme decision unit 1310 may decide whether the present invention is applied to a transform coefficient. According to an exemplary embodiment, when an image coding apparatus applies the present invention to the transform coefficient to code a target image, the image coding apparatus may represent whether the present invention is applied to the transform coefficient, by using a flag bit of a slice header. The transform scheme decision unit may decide whether the present invention is applied to the transform coefficient, by using a flag bit of a slice.

Also, the transform scheme decision unit 1310 may decide a transform scheme with respect to a transform coefficient. When the present invention is applied to the transform coefficient, the transform coefficient may be discrete sine transformed or discrete cosine transformed. The image coding apparatus may represent a transform scheme applied to the transform coefficient by using a flag bit of a macroblock. That is, the flag bit of the macroblock may represent transform scheme information. The transform scheme decision unit 1310 may decide the transform scheme with respect to the transform coefficient, by using the flag bit of the macroblock.

According to an exemplary embodiment, the flag bit of the macroblock may be stored based on a CBP value with respect to the transform coefficient. That is, the image coding apparatus may store the flag bit in the macroblock only when the CBP value is not “0”, and may not store the flag bit in the macroblock when the CBP is “0”.

When the transform coefficient is discrete sine transformed, the first inverse transforming unit 1320 may generate a decoded image with respect to the transform coefficient by using a discrete sine inverse transform scheme. The first inverse transforming unit 1320 may include an inverse quantizing unit 1321 and a discrete sine inverse transforming unit 1322.

The inverse quantizing unit 1321 performs inverse quantization on a quantized transform coefficient. Inverse quantization has already been described with reference to FIG. 2, and thus, hereinafter, a detailed description thereto will be omitted.

The discrete sine inverse transforming unit 1322 performs discrete sine inverse transform on an inverse-quantized transform coefficient to generate a decoded image. Discrete sine inverse transform has already been described with reference to FIG. 2, and thus, hereinafter, a detailed description thereto will be omitted.

When the discrete cosine transform is applied to the transform coefficient, the second inverse transforming unit 1330 generates a decoded image with respect to the transform coefficient by using a discrete cosine inverse transform scheme. The second inverse transforming unit 1330 may include an inverse quantizing unit 1331 and a discrete cosine inverse transforming unit 1332.

The inverse quantizing unit 1331 may perform inverse quantization on a quantized transform coefficient. The inverse quantization has already been described with reference to FIG. 2, and thus, hereinafter, a detailed description thereto will be omitted.

The discrete cosine inverse transforming unit 1332 may perform discrete cosine inverse on an inverse-quantized transform coefficient to generate a decoded image.

According to an exemplary embodiment, a decoded image generated from the first inverse transforming unit 1320 or the second inverse transforming unit 1330 is not an input image inputted to the image coding apparatus, but corresponds to a residual image that is a difference between the input image and a prediction image.

The image restoring unit 1340 may generate a prediction image with respect to a transform coefficient based on a reference image with respect to the transform coefficient. The image restoring unit 1340 may generate a restoration image with respect to the transform coefficient based on the prediction image and the decoded image. The restoration image corresponds to the input image inputted to the image coding apparatus.

Figure 14:
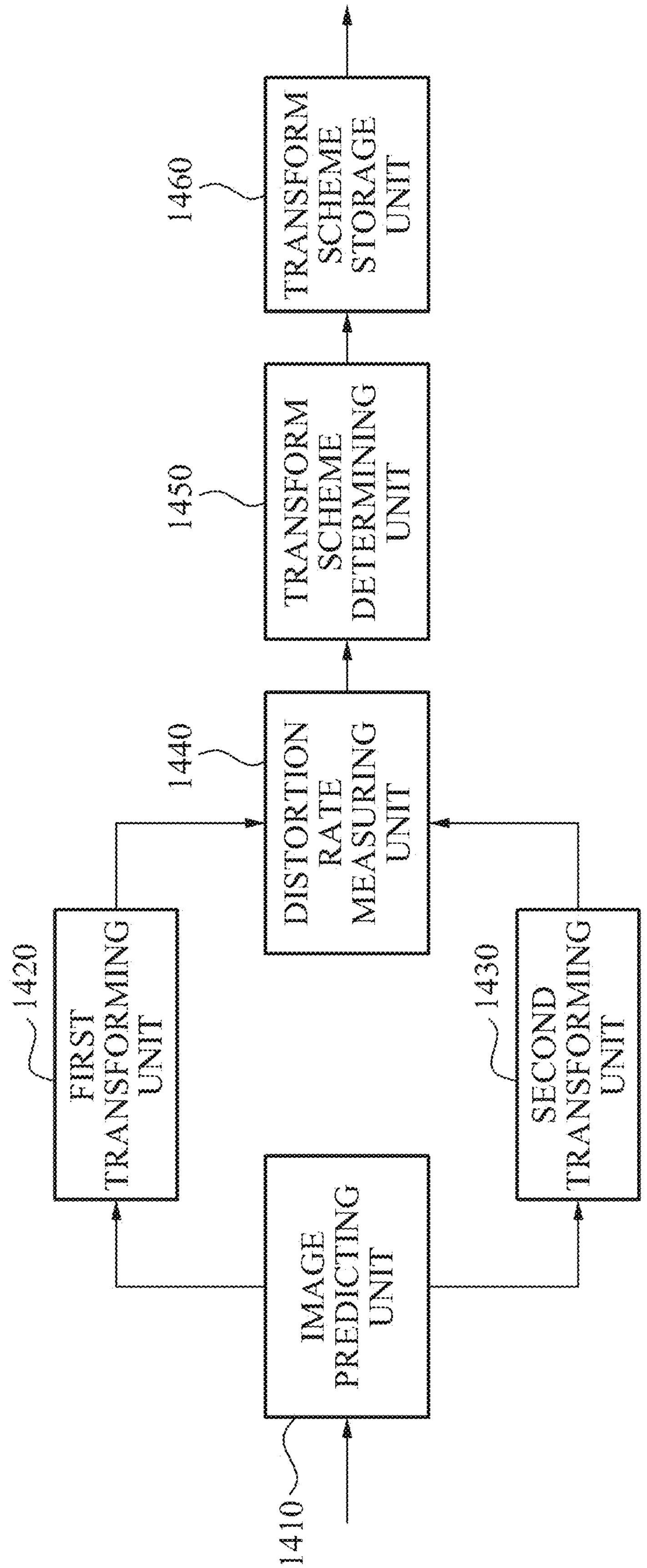
FIG. 14 is a block diagram illustrating a configuration of an image coding apparatus according to another exemplary embodiment of the present invention.

FIG. 14 is a block diagram illustrating a configuration of an image coding apparatus according to another exemplary embodiment of the present invention. The image coding apparatus may include an image predicting unit 1410, a first transforming unit 1420, a second transforming unit 1430, a distortion rate measuring unit 1440, a transform scheme determining unit 1450, and a transform scheme storage unit 1460.

The image predicting unit 1410 may generate a prediction image with respect to an input image based on a reference image with respect to the input image. Also, the image predicting unit 1410 may calculate a difference between the input image and the prediction image as a target image. That is, a target image that is coded by the first transforming unit 1420 or the second transforming unit 1430 is a residual image with respect to the input image.

The first transforming unit 1420 may generate a first transform coefficient by performing a discrete cosine transform on the target image. Also, the first transforming unit 1420 may generate a decoded image with respect to a first transform coefficient by performing a discrete cosine inverse transform on the first transform coefficient.

The second transforming unit 1430 may generate a second transform coefficient by performing a discrete sine transform on the target image. Also, the second transforming unit 1430 may generate a decoded image with respect to the second transform coefficient by performing a discrete sine inverse transform on the first transform coefficient.

The distortion measuring unit 1440 may compare the target image with the decoded image with respect to the first transform coefficient to measure a distortion rate of the decoded image with respect to the first transform coefficient. Also, the distortion rate measuring unit 1440 may compare the target image with the decoded image with respect to the second transform coefficient to measure a distortion rate of the decoded image with respect to the second transform coefficient.

The transform scheme determining unit 1450 may select a transform coefficient with respect to the target image based on the distortion rate of the decoded image with respect to the first transform coefficient and the distortion rate of the decoded image with respect to the second transform coefficient. As an exemplary embodiment, the transform scheme determining unit 1450 may select a transform coefficient corresponding to a decoded image having a smaller distortion rate as the transform coefficient with respect to the target image.

The transform scheme storage unit 1460 may store transform scheme information with respect to the selected transform coefficient in a macroblock header. A s an example, when the transform coefficient is discrete sine transformed, the transform scheme storage unit 1460 may store the transform scheme information by representing a flag bit of the macroblock head as “1”. Also, when the transform coefficient is discrete cosine transformed, the transform scheme storage unit 1460 may store the transform scheme information by representing the flag bit of the macro block header as “0”.

According to an exemplary embodiment, the transform scheme storage unit 1470 may store the transform scheme information based on a CBP with respect to the transform coefficient. A CBP value indicates existence of a transform coefficient. That is, when the transform coefficient exists, the CBP value may be “1”, and when the transform coefficient does not exist, the CBP value may be “0”. The transform scheme storage unit 1470 may not store the transform scheme information when the CBP value is “0”.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An image decoding apparatus comprising:

a memory; and at least one processor connected to the memory, the at least one processor configured to:

determine a set of scaling factors for inverse-quantizing transform coefficients of a current block based on a size of the current block;

inverse-quantize the transform coefficients of the current block based on the set of scaling factors and a quantization variable given by dividing a quantization parameter by a pre-determined constant value;

decide an inverse-transform scheme with respect to the transform coefficients of the current block as one of discrete cosine transform (DCT) and discrete sine transform (DST); and generate a decoded image based on the inverse-quantized transform coefficients according to the decided inverse-transform scheme, wherein the inverse-quantizing is performed based on multiplying each of the transform coefficients of the current block to a corresponding scaling factor among the set of scaling factors and left-shifting a result of the multiplication of the each of the transform coefficients with the corresponding scaling factor, wherein the set of scaling factors is determined by selectively using one of a first predefined table from which one or more first candidate tables for a 4×4 block are derivable, each of the one or more first candidate tables for the 4×4 block specifying sixteen explicit integer values mapping one-to-one for sixteen locations in the 4×4 block and a second predefined table from which one or more second candidate tables for an 8×8 block are derivable, each of the one or more second candidate tables for the 8×8 block specifying sixty four explicit integer values mapping one-to-one for sixty four locations in the 8×8 block according to the size of the current block, each of the first candidate tables comprises 'n' distinct values, 'n' being smaller than 16, each of the second candidate tables comprises 'm' distinct values, 'm' being smaller than 64, and 'n' being smaller than 'm'.

2. The image decoding apparatus of claim 1, wherein the left-shifting is performed by the quantization variable.

3. The image decoding apparatus of claim 1, wherein the at least one processor is further configured to:

generate a prediction image with respect to the transform coefficients based on a reference image; and generate a restoration image based on the prediction image and the decoded image.

4. An image encoding apparatus comprising:

a memory; and at least one processor connected to the memory, the at least one processor configured to:

inverse-quantize transform coefficients of a current block based on a set of scaling factors and a quantization variable given by dividing a quantization parameter by a pre-determined constant value, the set of scaling factors being determined based on a size of the current block;

inverse-transform the inverse-quantized transform coefficients based on a transform scheme, the transform scheme with respect to transform coefficients of the block being decided as one of the discrete cosine transform (DCT) and the discrete sine transform (DST); and generate a decoded image based on the inverse-transformed and inverse-quantized transform coefficients, wherein the inverse-quantizing is performed based on multiplying each of the transform coefficients of the current block to a corresponding scaling factor among the set of scaling factors and left-shifting a result of the multiplication of the each of the transform coefficients with the corresponding scaling factor, wherein the set of scaling factors is determined by selectively using one of a first predefined table from which one or more first candidate tables for a 4×4 block are derivable, each of the one or more first candidate tables for the 4×4 block specifying sixteen explicit integer values mapping one-to-one for sixteen locations in the 4×4 block and a second predefined table from which one or more second candidate tables for an 8×8 block are derivable, each of the one or more second candidate tables for the 8×8 block specifying sixty four explicit integer values mapping one-to-one for sixty four locations in the 8×8 block according to the size of the current block, each of the first candidate tables comprises 'n' distinct values, 'n' being smaller than 16, each of the second candidate tables comprises 'm' distinct values, 'm' being smaller than 64, and 'n' being smaller than 'm'.

5. A n apparatus for transmitting a bitstream, the apparatus comprising:

at least one processor configured to obtain the bitstream; and a transmitter configured to transmit the bitstream generated by an image encoding method, the image encoding method comprising:

inverse-quantizing transform coefficients of a current block based on a set of scaling factors and a quantization variable given by dividing a quantization parameter by a pre-determined constant value, the set of scaling factors being determined based on a size of the current block;

inverse-transforming the inverse-quantized transform coefficients based on a transform scheme, the transform scheme with respect to transform coefficients of the block being decided as one of the discrete cosine transform (DCT) and the discrete sine transform (DST); and generating a decoded image based on the inverse-transformed and inverse-quantized transform coefficients, wherein the inverse-quantizing is performed based on multiplying each of the transform coefficients of the current block to a corresponding scaling factor among the set of scaling factors and left-shifting a result of the multiplication of the each of the transform coefficients with the corresponding scaling factor, wherein the set of scaling factors is determined by selectively using one of a first predefined table from which one or more first candidate tables for a 4×4 block are derivable, each of the one or more first candidate tables for the 4×4 block specifying sixteen explicit integer values mapping one-to-one for sixteen locations in the 4×4 block and a second predefined table from which one or more second candidate tables for an 8×8 block are derivable, each of the one or more second candidate tables for the 8×8 block specifying sixty four explicit integer values mapping one-to-one for sixty four locations in the 8×8 block according to the size of the current block, each of the first candidate tables comprises 'n' distinct values, 'n' being smaller than 16, each of the second candidate tables comprises 'm' distinct values, 'm' being smaller than 64, and 'n' being smaller than 'm'.

* * * * *